H. Fassman.
Cotton Bale Tie.
N°61,527. Patented Jan. 29, 1867.
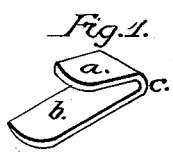
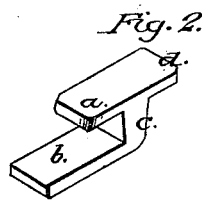
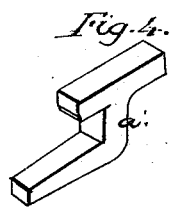
Witnesses:
J.W. Coombs
F.W. Reed
Inventor:
Henry Fassman
per Munn & Co.
attorneys

United States Patent Office.

HENRY FASSMAN, OF NEW ORLEANS, LOUISIANA.

Letters Patent No. 61,527, dated January 29, 1867.

IMPROVEMENT IN COTTON-BALE TIES.

*The Schedule referred to in these Letters Patent and making part of the same.*

TO ALL WHOM IT MAY CONCERN:

Be it known that I, HENRY FASSMAN, of New Orleans, in the parish of Orleans, and State of Louisiana, have invented a new and improved Hoop Lock; and I do hereby declare that the following is a full, clear, and exact description of the same, reference being had to the annexed drawings, making a part of this specification, in which—

Figures 1 and 2 are perspective views of my invention.

Figure 3 is a view of my invention applied to the ends of a bale-hoop and connecting them together.

Figure 4 is a view of a hoop-lock previously constructed, drawn for the purpose of showing the difference between it and my invention.

Similar letters of reference indicate corresponding parts in the several figures.

This invention consists in using, in connection with perforations at the ends of the bale-hoop, a flat metal hook, provided with a shoulder, if desired, and used either singly or doubly as may be required. The object of the invention is to obtain a simple and efficient hoop-lock, that may be readily inserted into the perforations of the hoop without the liability of casually slipping therefrom.

To enable those skilled in the art to fully understand and construct my invention, I will proceed to describe it.

The simplest form of my invention is that of a flat hook, as shown in fig. 1, one leg, $a$, of the hook being about half the length of the other leg $b$. The two legs $a$ $b$ are not quite parallel with each other; they slightly diverge from the curve or neck, $c$. The hook is of equal width throughout its entire length. In fig. 2 the same hook is shown with the addition of a shoulder, $d$. This shoulder is in line with the shorter leg $a$ of the hook, and the neck $c$ of the hook is quite short and thick, as shown clearly in fig. 2. The ends of the hoop, shown in red, fig. 3, are perforated and overlapped, and the long leg of the hook is passed through the perforations, as shown clearly in fig. 3. The flat form of the hook prevents its turning in the perforations of the hoop, and effectually prevents its slipping out therefrom. The short neck $c$ also serves to prevent the casual disengagement of the hook. The shoulder $d$ is not very important; only where a single hook is used it gives it a more symmetrical appearance, but does not add materially to its efficiency. If desired the hooks may be placed in each pair of perforations in the ends of the hoop, the hooks being placed back to back. This arrangement also effectually precludes the casual slipping out of the hooks from the perforations in the hoops.

I am aware that hoop-locks have been made in hook form, but so far as I am aware those previously devised have been constructed of a cylindrical rod, or of square form, as shown in fig. 4, and with comparatively long necks, $a'$. This arrangement or mode of construction has been found quite inefficient. The hooks are liable to turn and work out from the perforations in the hoops, and the latter consequently released and allowed to drop from the bale. The broad flat form of my invention prevents such a contingency, as the hooks cannot possibly turn when adjusted in the perforations of the hoops. The hooks may be constructed of wrought or rolled iron bent in proper form, or they may be of cast iron made malleable.

Having thus described my invention, what I claim as new, and desire to secure by Letters Patent, is—

A hoop-lock constructed in the shape of a hook, and of flat form, with legs $a$ $b$, of different lengths, and a short curve or neck $c$, and with or without a shoulder $d$, substantially as and for the purpose set forth.

H. FASSMAN.

Witnesses:
WILLIAM WREN,
WM. S. E. SEVEY.